United States Patent Office 3,190,115
Patented June 22, 1965

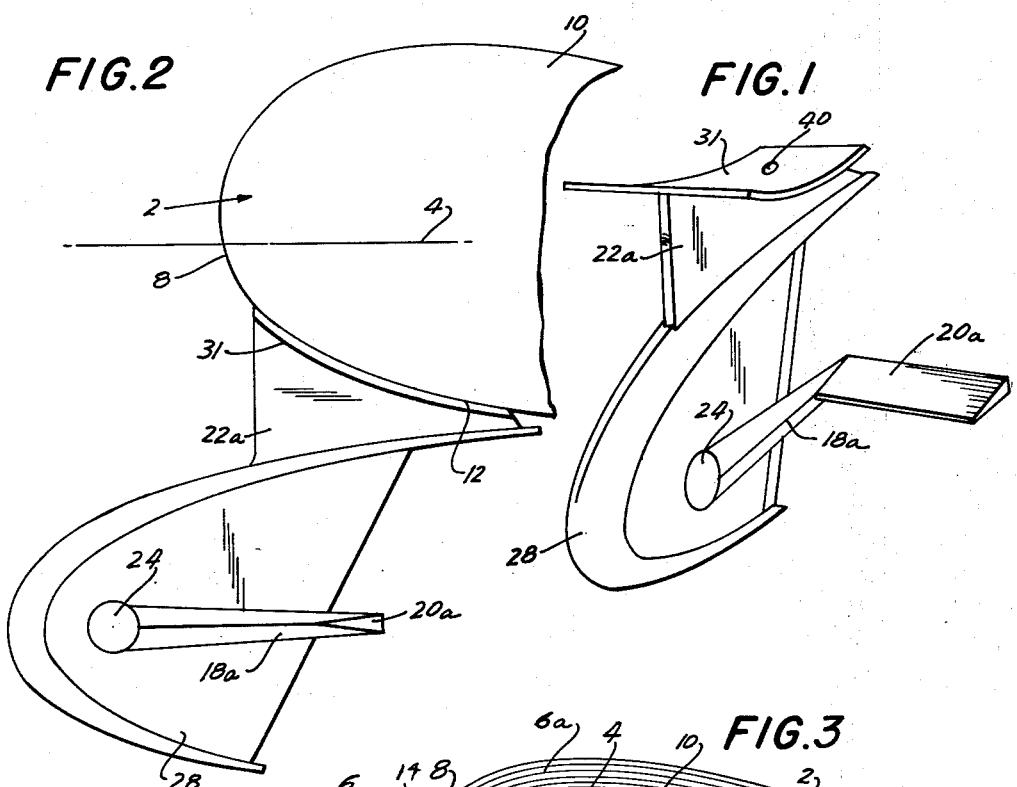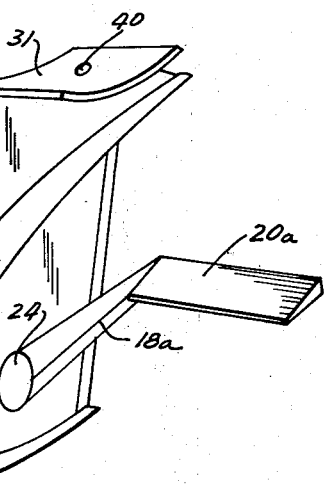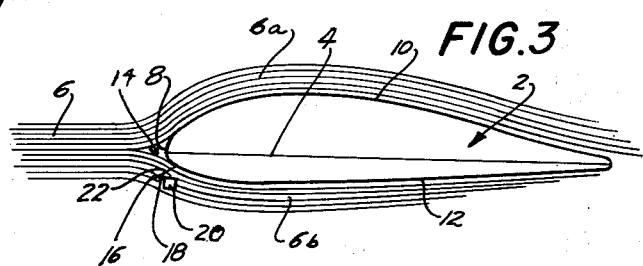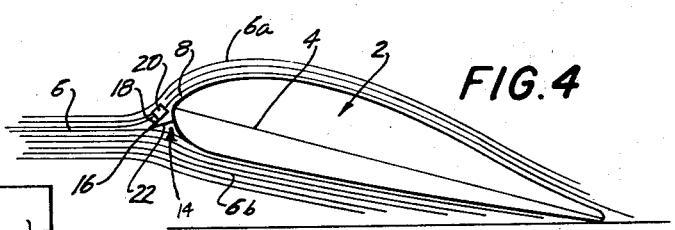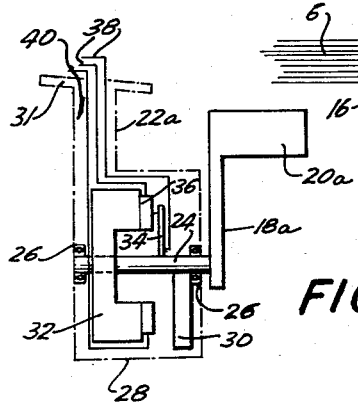

3,190,115
ANGLE OF ATTACK MEASURING DEVICE
Allan B. Heinsohn, Valley Cottage, N.Y., assignor to Monitair Corp., Valley Cottage, N.Y., a corporation of New York
Filed May 2, 1962, Ser. No. 191,899
20 Claims. (Cl. 73—180)

The present invention relates to a device for sensing and indicating the angle of attack of an aircraft wing.

Lift is developed in an airplane by the flow of air over the wing. As the wing moves through the air the air divides, some air flowing over the upper surface and some air over the lower surface, and the lift is determined by the difference between the air flow along the lower surface of the wing and the air flow along the upper surface thereof. The angle which the wing makes with respect to the oncoming air determines the nature and division of the air flow over the upper and lower wing surfaces respectively, and hence is directly related to the lift which the wing develops. Consequently it is a matter of supreme importance for the pilot to know, at each moment, what angle the wing of his aircraft is making with the air. This angle is known as the angle of attack. To know the angle of attack is to know the lift which a given wing is producing. As a matter of more rigorous definition, angle of attack is the angle between the mean aerodynamic chord of the wing and the direction (nominally horizontal) of relative air flow.

The most crucial consideration presented to the pilot in connection with angle of attack is that said angle should never exceed that at which lift will decrease to such a degree that the aircraft will stall. However, knowledge of the actual angle of attack is desirable not only in that specific situation, to prevent disaster, but also to ensure that the aircraft is in the optimum attitude, for whatever maneuver may be desired—takeoff, landing, climb, economical cruising, maximum speed, etc.

In the past no satisfactory detector of actual angle of attack has been available to the pilot. Some devices have been proposed which will give the pilot warning of an impending stall condition, but these devices are of little or no assistance in giving to the pilot a useful presentation of the angle of attack of the airplane's wing over the full range of flight conditions from maximum angle of attack near stall to minimum angles of attack for the highest cruising speeds. The pilot, in attempting to determine the angle of attack of his aircraft at any given moment, has been forced to rely upon inferences derived from the readings of instruments which measure parameters other than angle of attack, e.g. airspeed.

It is the prime object of the present invention to provide a measuring device which may readily be applied to or used with normally operational aircraft, which will measure actual angle of attack with a high degree of accuracy and sensitivity, and which can be used to convey to the pilot intelligence as to the instantaneous value of angle of attack in a direct manner. These indications to the pilot can be either in terms of the actual angle, or in terms of optimum or permissible attitudes of the aircraft for different types of maneuvers. By means of this instrument the pilot is therefore apprised in an understandable and direct manner of that factor which is of primary concern to him—the lift which the wings are producing.

It may also be noted that the independence of angle of attack from gross weight changes in the aircraft and from changes in the density of the air make possible a flight information instrument that is more accurately informative than the present widely used interpolation of the airspeed indicator.

One problem which has plagued the industry in connection with the measurement of angle attack is that it will vary over only a very small range in normal cruising attitudes, the range for a given airplane typically being only twelve or thirteen degrees. This range is too small for accurate indicator presentation, particularly at the low angles of attack used for high speed flight. When new models of aircraft are being flight tested direct measurement of angle of attack has been accomplished by mounting a forwardly extending boom on the wing or nose of the prototype aircraft, the boom carrying an air-flow-sensitive vane which is located in the area of free air flow well ahead of or below the wing, where air flow is not disturbed by any part of the aircraft. The use of such long booms is impractical on production and daily-used aircraft, as distinguished from prototype and special test aircraft, for aerodynamic and structural reasons. Moreover, instruments sensitive enough to measure angle of attack directly within the small range of changes in angle of attack which are characteristic of various cruising attitudes are necessarily laboratory-type instruments, and are not practical for production manufacture or everyday use.

In accordance with the present invention, I utilize a vane which is sensitive to the direction of air flow, and I so mount that vane relative to the aircraft wing that its range of air-flow-induced movement, as the actual angle of attack of the wing changes, is related to, but is considerably greater than, the actual change in angle of attack. Because of the magnified range of movement of the vane for a given change in angle of attack, the angle of attack may be measured and indicated in an accurate and sensitive manner, and by an instrument sturdy enough to be used on an everyday basis.

In order to achieve the necessary magnified angular displacement of the vane, I position the vane in the air-flow-deflection area adjacent the leading edge of the wing, that being the area where the air divides into those portions which flow over the upper and lower wing surfaces respectively, and I so mount the vane that it is capable of orienting itself accurately in accordance with the changes in direction of the air flow where it is located, throughout the entire range of variation of angle of attack. When the angle of attack of the wing changes, the air deflected by the oncoming wing in said air-flow-deflection area will undergo a sizable change in direction, and that change in direction will be reflected in a correspondingly sizable movement of the vane. Hence, the vane can be utilized to produce a signal indicative of its orientation, and that signal can be used in any known manner to actuate a cockpit instrument, the indicating element of that instrument, such as a pointer, being moved sufficiently, even for small changes in angle of attack, so as to give a useful and readily readable signal to the pilot.

In order to permit the vane to accurately orient itself in accordance with the air flow to which it is subjected, and in order to cause the vane to be affected by the air in said air-flow-deflection area in a useful and accurate manner, the vane is mounted on a support so as to pivot about an axis, both the vane and its axis being external of the wing and the axis preferably being located forwardly of the vane.

To the accomplishment of the above, and to such other objects as may hereinafter appear, the present invention relates to an angle of attack measuring device, as defined in the appended claims and as described in this specification, taken together with the accompanying drawings, in which:

FIG. 1 is a three-quarter perspective view of a preferred embodiment of the vane and mounting means therefor;

FIG. 2 is a side elevational view of the assembly of FIG. 1 shown in position on an aircraft wing;

FIGS. 3 and 4 are diagrammatic views illustrating a wing on which the device of the present invention is mounted, that wing being shown in different positions of angle of attack;

FIG. 5 is a schematic view of the vane mounting assembly, illustrating one way in which a vane-position signal may be generated.

Figure 6:
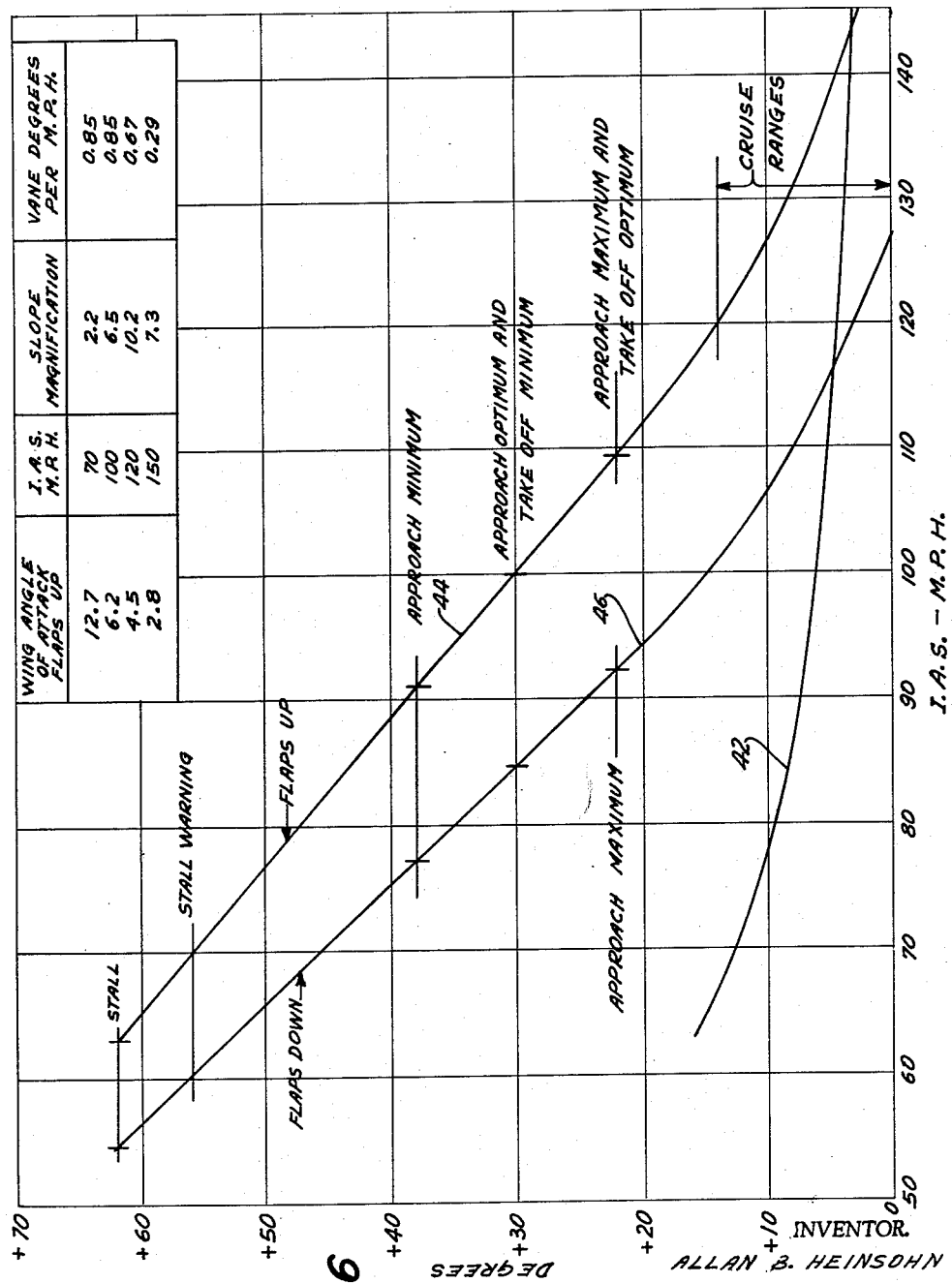
FIG. 6 is a graphical representation of the relationship between changes in actual angle of attack and changes in vane position for a typical installation.

Making reference first to FIGS. 3 and 4, an aircraft wing generally designated 2 is disclosed, the line 4 thereon representing its mean aerodynamic chord. The oncoming air through which the wing 2 pushes as the aircraft flies is represented by the lines 6, and the leading edge of the wing 2 is represented by the reference numeral 8. The oncoming air 6, in the area well in advance of the wing 2, is indicated as moving relative to the wing in a horizontal direction. As the wing 2 meets the air 6, that air divides into two paths 6a and 6b flowing respectively over the upper and lower surfaces 10 and 12 of the wing 2. There is an area immediately in advance of the leading edge 8, designated by the reference numeral 14, where the air 6 divides into the paths 6a and 6b, that area here being termed the air-flow-deflection area. The angle of attack of the wing 2 is defined as the angle between the mean aerodynamic chord 4 and the direction of relative air flow, that is to say, the direction of movement of the air 6 relative to the wing 2. In FIG. 3 the attitude of the wing 2 is such as to be at a very small angle of attack, such as two degrees. In FIG. 4 the wing 2 is shown at a greater angle of attack, such as fifteen degrees.

Considering now a point 16 located in the air-flow-deflection area 14, in advance of and slightly below the wing leading edge 8, and comparing FIGS. 3 and 4, it is seen that when the angle of attack is low (FIG. 3) the point 16 is in effect in the lower air flow path 6b, while when the angle of attack is high (FIG. 4) the point 16 is in effect in the upper air flow path 6a. The actual direction of air flow past the point 16 is indicated by the line 18, to which a schematically indicated vane 20 is attached, the line 22 schematically representing a structural member fixed to and projecting from the wing 2. It will be apparent from a comparison of FIGS. 3 and 4 that although the difference in the angle of attack between those two figures is approximately 13 degrees, the orientation of the line 18 relative to the line 22 between those two figures is many times as great, and is illustrated as being about 60 degrees. Since the line 18 represents the direction of air flow past the point 16, the line 18 being indicated as pivoting, in effect, about the point 16, it will be apparent that the pivotal excursion of the line 18, as between the two situations illustrated in FIGS. 3 and 4, is many times the actual change in angle of attack. A fixed relationship exists between the angle of attack and the direction of air flow past the points 16. Consequently, by sensing the direction of the air flow past the point 16 a signal can be produced which can be calibrated in terms of angle of attack, thereby to actuate a suitable indicating instrument in the cockpit of the aircraft. It will further be apparent that the signal thus produced has a range of variation greater than that of the actual change in angle of attack, thereby greatly increasing the sensitivity and reliability of the sensing and indicating system.

Turning now to FIGS. 1, 2 and 5, which illustrate a preferred structural embodiment of the present invention, a vane 20a is mounted on the end of arm 18a, the arm being secured to shaft 24 which is rotatably mounted in any appropriate manner, as by means of the ball bearings 26, on housing 28, the external surface of which may be streamlined for obvious aerodynamic reasons. A counterweight 30 may be mounted on the shaft 24 within the housing 28 opposite the arm 18a and vane 20a. A strut 22a connects the housing 28 to a securing plate 31 which is adapted to be secured in any appropriate manner, as by welding or riveting, to the skin of the wing 2. The arrangement is such that the shaft 24, defining the axis about which the vane 20a and arm 18a pivot relative to the housing 28, is located forwardly of the vane 20a and forwardly and downwardly from the leading wing edge 8, the shaft 24 corresponding to the point 16 in FIGS. 3 and 4. While the precise location of the shaft 24 relative to the wing 2 may be varied somewhat from installation to installation and from one type of plane to another, it is essential, if the desired magnification of angle of attack is to be achieved, that it be located in the air-flow deflection area 14. Preferably the shaft 24 is located in advance of the leading edge 8 by a distance on the order of 6% of the length of the mean aerodynamic chord 4, and it is preferably spaced below an extension of the mean aerodynamic chord 4 by a distance on the order of 2% of the length of the line 4.

The housing 28 will contain any suitable means for sensing the rotative position of the arm 18a and vane 20a relative to the housing 28 and transmitting a signal corresponding thereto to the interior of the aircraft, where that signal can be used to actuate any desired type of indicating apparatus. The signal could be either mechanical or electrical. An electrical signal is preferred because of relative ease of transmission. To that end, as schematically illustrated in FIG. 5, a potentiometer generally designated 32 is mounted within the housing 28, and the shaft 24 is provided with a brush 34 slidable along the electrically active element 36 of the potentiometer 32, suitable electrical leads 38 extending from the brush 34 and the electrically active element 36 and passing through an opening 40 in the strut 22a to the interior of the aircraft. The leads 38 extend to an electrical indicating system including a voltage source and an indicating instrument such as a galvanometer, the needle of the galvanometer being positioned in accordance with the rotative position of the arm 18a and the vane 20a.

The advantages of the device here disclosed are illustrated by the graphical portrayal in FIG. 6, representing test results on a Beech Bonanza aircraft having a gross weight of 2600 pounds and fitted with the device here disclosed. The horizontal coordinates represent indicated air speed in miles per hour. The vertical coordinates are graduated in terms of degrees. Curve 42 represents the actual wing angle of attack with flaps up for different speeds, starting with the stalling speed of approximately 62 m.p.h. and going up to a high speed of approximately 145 m.p.h. Curve 44 represents the rotative position of the arm 18a and vane 20a for different air speeds of the aircraft with the flaps up, and curve 46 represents vane position with the flaps down. Various operating points are labelled on the graph.

Although the total variation in angle of attack as indicated on FIG. 6 is only approximately 12 degrees with flaps up, the corresponding range of movement of the vane 20a is approximately 60 degrees, thus producing an overall magnification corresponding to a factor of five. This in itself is clear indication of the value of the instant invention.

It may further be noted that of the total variation in actual angle of attack, most occurs in the low speed area close to stalling, while in the cruising range between say 100 m.p.h. and 140 m.p.h., there is a change in angle of attack of only about five degrees. Within the same range the vane 20 will move approximately 25 degrees. With a typical plane a difference of one mile per hour will be reflected in change of angle of attack of approximately 0.1 degree. This would produce an objectionably small signal if angle of attack were to be measured directly. However, by mounting the vane 20a in the manner and place here disclosed, the vane movement is so greatly magnified as to produce a truly useable signal. The table in the upper right hand corner of FIG. 6 shows, for four different angles of attack with corresponding indicated air speed, the factor by which the movement of the vane 20a is greater than change in actual angle of attack (Slope Magnification) and, for each of those points, the amount by which the angular position of the vane 20a will change for a change of one mile per hour in indicated air speed (Vane Degrees Per M.P.H.). It is noteworthy that the greater slope magnifications occur at the higher speeds, where such magnification is most needed because of the small rate of change of actual angle of attack.

It will be appreciated that the type of indication given to the pilot in accordance with the sensing of the position of the vane 20a can be of any type desired. It will preferably be quantitative, either in terms of actual angle of attack or in terms of a certain type of maneuver (as indicated by some of the legends on FIG. 6), but indication could also be by way of actuation of an alarm, either visual, aural, or both, upon the occurrence of a given condition, such as close approach to a stalling attitude.

The precise relationship between angle of attack and the rotative position of the vane 20a may vary from aircraft to aircraft, and in accordance with differences in the precise location of the shaft 24. However, each installation will normally be the same for planes of a given type, and once empiric calibration of the vane position—angle of attack relationship is made for a given installation, the devices of the present invention can thereafter be used in such installations on a production line basis.

By virtue of the arrangement here disclosed accurate determination of the angle of attack of aircraft while in flight can be continuously made and appropriate intelligence presented to the pilot accurately, with a high degree of sensitivity, and with a high degree of reliability. The structure involved is simple, compact, and does not appreciably adversely affect either the appearance or the aerodynamic capabilities of the aircraft on which it is mounted.

While but a single embodiment of the present invention has been here disclosed, it will be apparent that many variations may be made therein, all within the spirit of the invention as defined in the following claims.

I claim:

1. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane and adjacent said leading edge of said wing.

2. In the combination of claim 1, biasing means operatively connected to said vane and effective to cause said vane to tend to pivot about said axis in a direction opposite to that normally induced by the weight of said vane.

3. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane and in advance of said leading edge of said wing.

4. In the combination of claim 3, biasing means operatively connected to said vane and effective to cause said vane to tend to pivot about said axis in a direction opposite to that normally induced by the weight of said vane.

5. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane, and in advance of said leading edge of said wing by a distance on the order of 6% of the mean aerodynamic chord of said wing.

6. In the combination of claim 5, biasing means operatively connected to said vane and effective to cause said vane to tend to pivot about said axis in a direction opposite to that normally induced by the weight of said vane.

7. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane and adjacent and below said leading edge of said wing.

8. In the combination of claim 7, biasing means operatively connected to said vane and effective to cause said vane to tend to pivot about said axis in a direction opposite to that normally induced by the weight of said vane.

9. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane and adjacent said leading edge of said wing and below said leading edge by a distance on the order of 2% of the mean aerodynamic chord of said wing.

10. In the combination of claim 9, biasing means operatively connected to said vane and effective to cause said vane to tend to pivot about said axis in a direction opposite to that normally induced by the weight of said vane.

11. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movements; an airplane wing; and means operatively connected to said wing and to said support for locating said vane in the air-flow-deflection area adjacent the leading edge of said wing with said axis in advance of said vane and in advance of and below said leading edge of said wing.

12. In the combination of claim 11, biasing means operatively connected to said vane and effective to cause said vane to tend to pivot about said axis in a direction opposite to that normally induced by the weight of said vane.

13. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane and in advance of said leading edge of said wing and below said leading edge by a distance on the order of 2% of the mean aerodynamic chord of said wing.

14. In the combination of claim 13, biasing means operatively connected to said vane and effective to cause said vane to tend to pivot about said axis in a direction opposite to that normally induced by the weight of said vane.

15. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane, and in advance of said leading edge of said wing by a distance on the order of 6% of the mean aerodynamic chord of said wing, and below said leading edge.

16. In the combination of claim 15, biasing means operatively connected to said vane and effective to cause said vane to tend to pivot about said axis in a direction opposite to that normally induced by the weight of said vane.

17. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane in the air-flow-deflection area adjacent the leading edge of said wing with said axis in advance of said vane and in advance of said leading edge of said wing by a distance on the order of 6% of the mean aerodynamic chord of said wing and below said leading edge by a distance on the order of 2% of the mean aerodynamic chord of said wing.

18. In the combination of claim 17, biasing means operatively connected to said vane and effective to cause said vane to tend to pivot about said axis in a direction opposite to that normally induced by the weight of said vane.

19. In combination, a device effective to measure instantaneous values of angle of attack over substantially the entire operative range thereof comprising a support, a vane mounted on said support to pivot about an axis over a given range of movement, and sensing means operatively connected to said vane to sense its pivotal position about said axis at substantially all points within said range of movement; an airplane wing; and means operatively connected to said wing and to said support for locating said vane and said axis exteriorly of said wing with said vane in the air-flow-deflection area adjacent the leading edge of said wing and with said axis spaced from said wing.

20. In the combination of claim 19, biasing means operatively connected to said vane and effective to cause said vane to tend to pivot about said axis in a direction opposite to that normally induced by the weight of said vane.

References Cited by the Examiner
UNITED STATES PATENTS

| | | | |
|---|---|---|---|
| 2,337,753 | 12/43 | Lacoe | 340—27 |
| 2,478,967 | 8/49 | Greene | 340—27 |
| 2,818,730 | 1/58 | Giannini et al. | 73—186 |

FOREIGN PATENTS 707,167  4/54  Great Britain.

NEIL C. READ, *Primary Examiner.*
THOMAS B. HABECKER, *Examiner.*